United States Patent [19]

Smith et al.

[11] 4,144,986
[45] Mar. 20, 1979

[54] HOT MELT ADHESIVE PUMPING APPARATUS HAVING PRESSURE-SENSITIVE FEEDBACK CONTROL

[76] Inventors: Ray V. Smith, 7132 Newton Dr., Overland Park, Mo. 66203; Ray F. Smith, 1104 Mic-o-say, Blue Springs, Mo. 64015; Wesley D. Brizendine, 4314 E. 105th Ter., Kansas City, Mo. 64134; Robert L. Boatman, 9709 Mohawk La., Leawood, Kans. 66206

[21] Appl. No.: 860,861

[22] Filed: Dec. 15, 1977

Related U.S. Application Data

[60] Division of Ser. No. 725,540, Sep. 22, 1976, Pat. No. 4,090,640, which is a continuation-in-part of Ser. No. 598,584, Jul. 24, 1975, abandoned.

[51] Int. Cl.² .......................... B67D 5/62; B67D 5/48
[52] U.S. Cl. ....................................... 222/52; 222/413; 415/72; 415/131
[58] Field of Search .................. 415/72, 131, 132; 222/52, 55, 256–262, 146 HE, 412, 413, 318

[56] References Cited

U.S. PATENT DOCUMENTS

| | | | |
|---|---|---|---|
| 1,810,082 | 6/1931 | Norinder | 415/73 X |
| 2,411,971 | 12/1946 | MacMillin et al. | 415/72 X |
| 2,877,710 | 3/1959 | Barnhart | 415/131 X |
| 3,697,190 | 10/1972 | Haeutjens | 415/131 X |

*Primary Examiner*—David A. Scherbel
*Attorney, Agent, or Firm*—Schmidt, Johnson, Hovey & Williams

[57] ABSTRACT

A high-capacity pumping apparatus for handling thermoplastic materials such as hot melt adhesives is provided which is capable of safely and efficiently pumping materials heretofore thought to be impractical because of the high flow and melting points thereof. The apparatus preferably includes a heated pressure plate, an elongated, tapered, material-conveying barrel connected thereto, a complementally tapered, axially shiftable auger with the barrel, and pressure-responsive means coupled to the auger for automatically shifting the auger relative to the barrel in order to temporarily decrease pumping efficiency during momentary slowdowns in material flow so that dangerous pressure buildups within the apparatus are avoided, and for returning the auger to its normal pumping position when adequate material flow resumes. The shiftable barrel and auger pumping assembly is also coupled with counterbalancing mechanism for providing a constant opposing force against travel of the pumping assembly; this regulates and coordinates material pumping and precludes material loss and fouling of the pumping equipment caused by escape of material around the periphery of pressure plate during pumping. The device hereof also includes an SCR-controlled constant torque drive motor for the auger, a flexible material delivery conduit having a controlled, central resistance heating element therein, and barrel piercing structure for relieving the partial vacuum created within the barrel by virtue of pumping.

4 Claims, 12 Drawing Figures

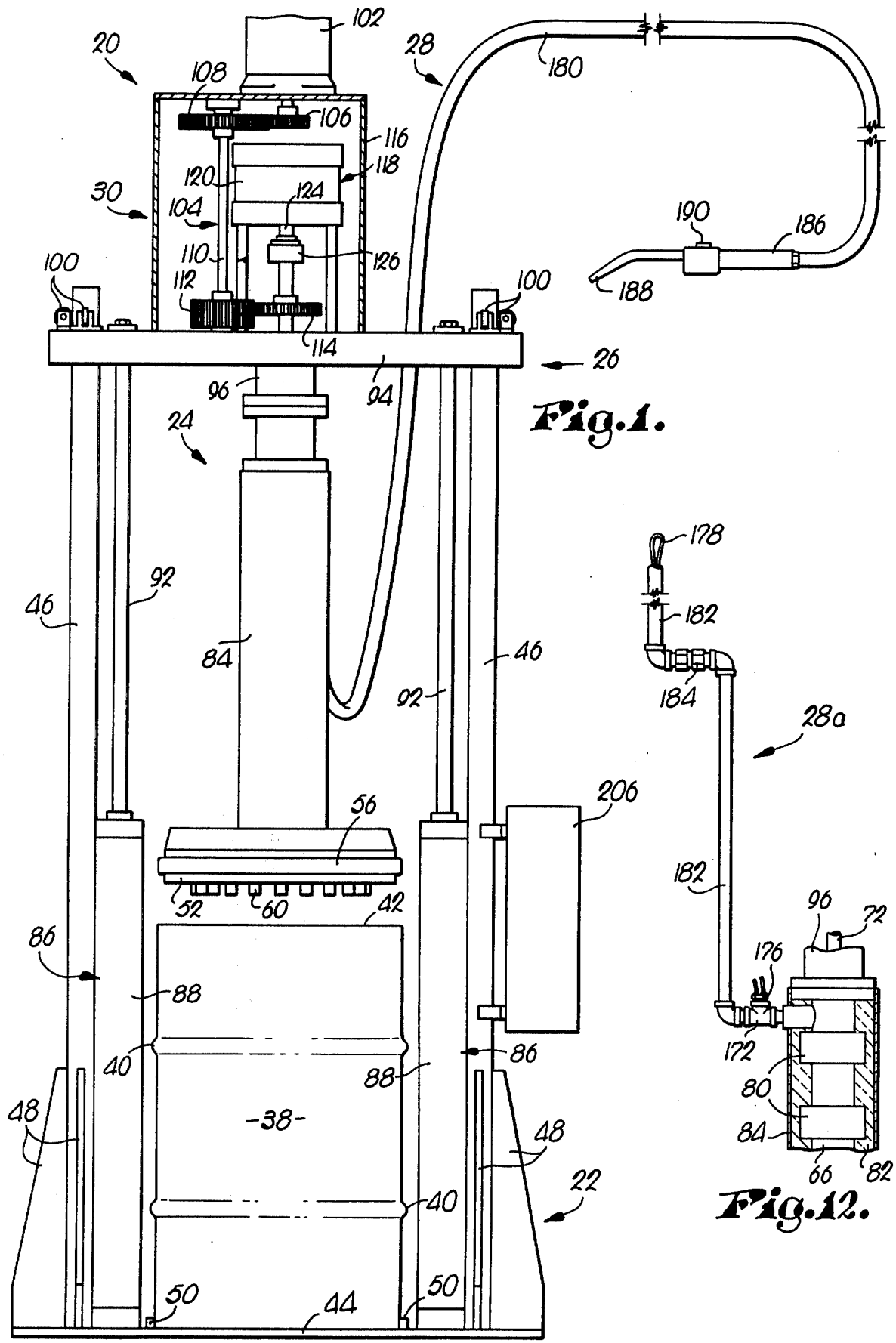

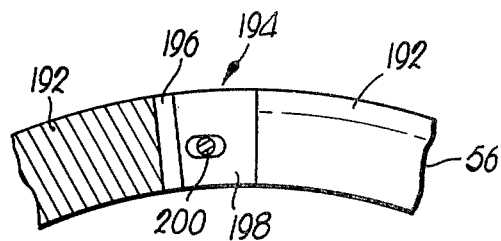
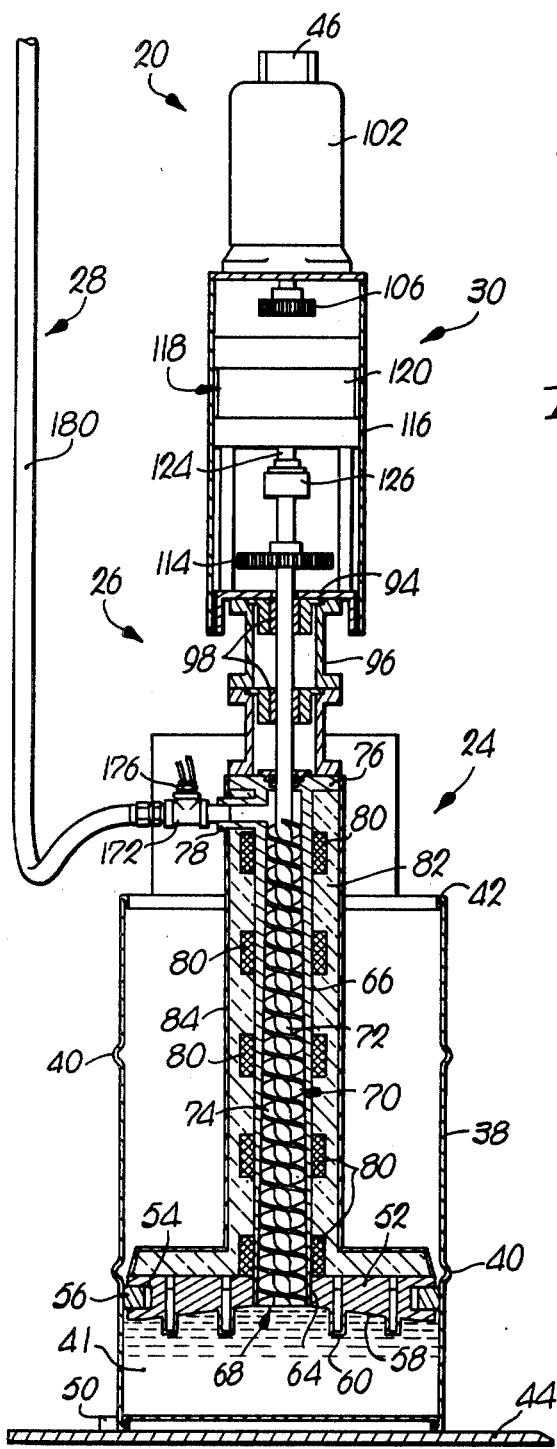
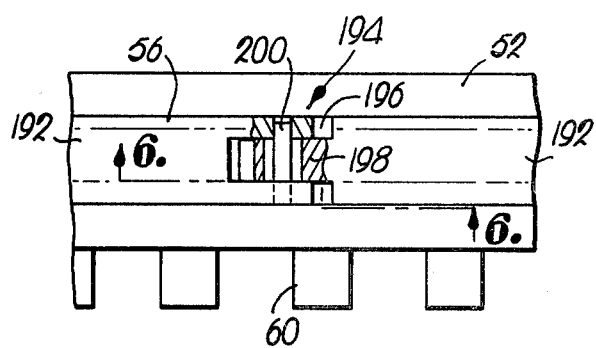
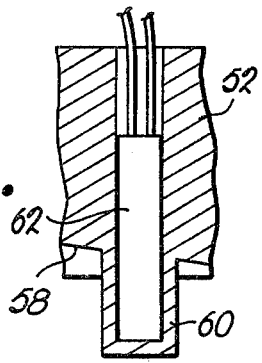
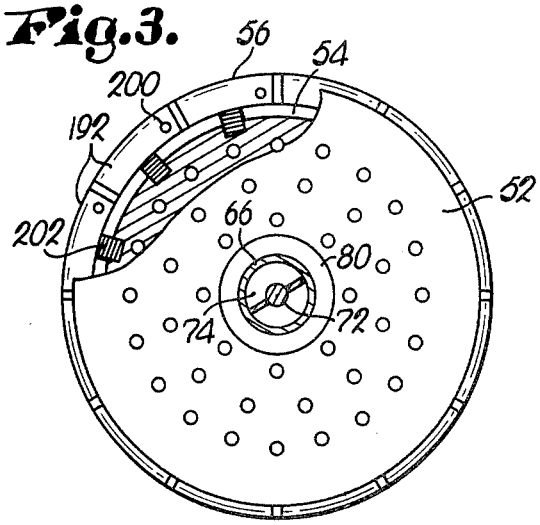

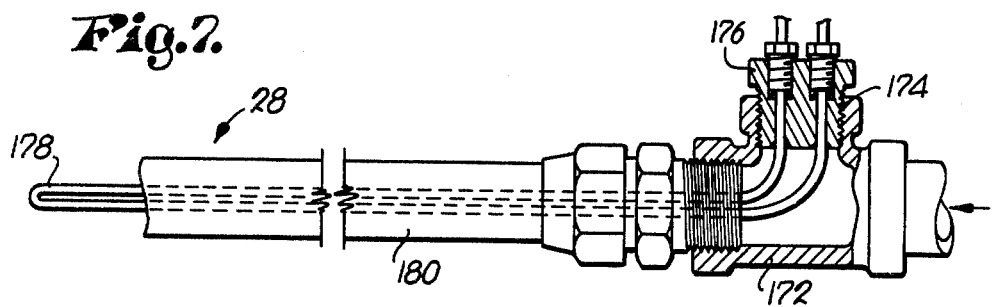
Fig. 7.
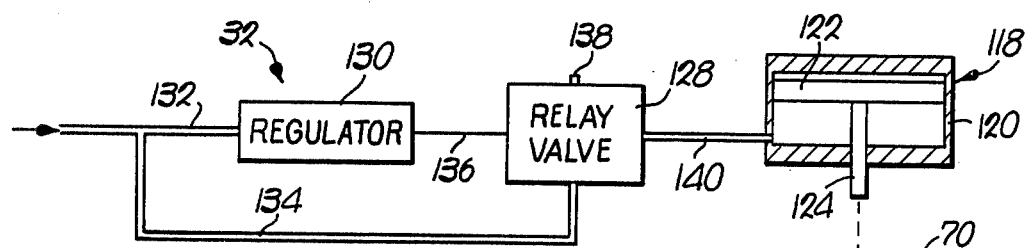
Fig. 8.
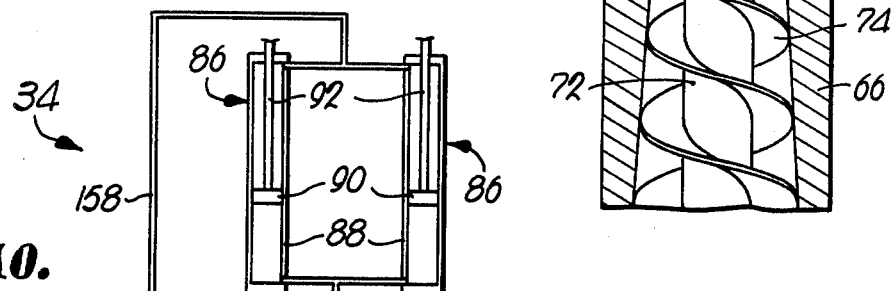
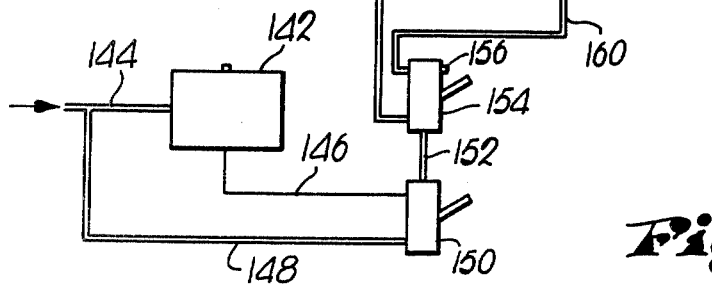
Fig. 10.
Fig. 9.
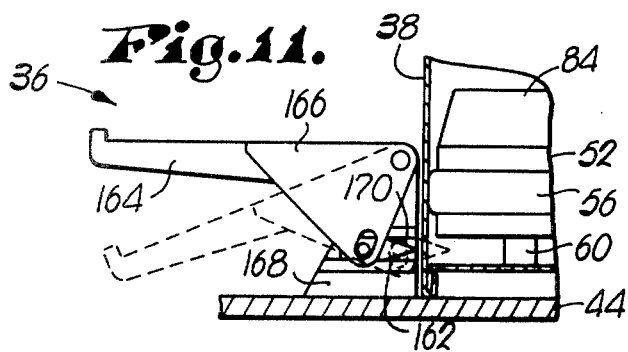
Fig. 11.

HOT MELT ADHESIVE PUMPING APPARATUS HAVING PRESSURE-SENSITIVE FEEDBACK CONTROL

This is a division of application Ser. No. 725,540, filed on Sept. 22, 1976, now U.S. Pat. No. 4,090,640, which in turn was a continuation-in-part of Ser. No. 598,584, July 24, 1975, now abandoned.

This invention relates to a pumping apparatus of the type used in handling thermoplastic materials such as so-called hot melt adhesives which are normally solid at room temperatures. More particularly, it is concerned with an auger-type pumping device which is capable of efficiently and safely handling thermoplastic adhesives and the like which have heretofore been impossible to handle and use on a commercial scale by virtue of their high flow and melt points. A particular feature of the invention is provision of pressure-responsive means for automatically regulating pumping efficiency by appropriate shifting of the auger, so that undue pressure buildups within the apparatus are avoided. Moreover, the pumping apparatus preferably includes means for counterbalancing the gravity shifting of the barrel and auger assembly so that material loss and equipment fouling is minimized.

For a number of years makers of automobiles and appliances have made use of high melting point thermoplastic adhesives in the construction of their products. For example, auto makers oftentimes apply strips of hot melt adhesive around the windshield frame of an automobile, whereupon the windshield is set in place and securely held therein by the adhesive. In some cases hot melt adhesives are sold in strips and are placed in position and heated. The more common practice however is to ship and handle such hot melt adhesives as a bulk product in large barrels as a solid material. The latter expedient of course necessitates the use of specialized apparatus for progressively softening the thermoplastic adhesive and pumping the same for ultimate use.

Several hot melt adhesive pumping devices have been proposed in the past for handling the bulk product. For example, one unit commonly in use provides a reciprocal, heated pressure plate in conjunction with an air-driven reciprocating pump. In the use of this device the pressure plate is lowered into contact with the bulk adhesive and the latter is removed from the container by the air pump. Separate means in the form of a fluid heat exchange apparatus is provided around the material barrel for the purpose of heating and softening the initially solid material in order to permit pumping thereof.

In practice however, a number of unresolved problems have detracted from the usefulness of such prior hot melt pumping devices. A prime deficiency in such units stems from the fact that they are normally capable of handling hot melt materials having flow points only up to about 400° F. In addition, materials of very high viscosity are also difficult to efficiently pump with such prior devices. These factors represent considerable drawbacks since many modern-day adhesives having desirable sealing properties melt at considerably higher temperatures, e.g., 600°-700° F., and are extremely viscous.

Another problem associated with such prior units stems from the delivery apparatus used in conjunction therewith. For instance, most of these devices employ a continuous, insulated, externally heated hose for conveying the pumped material to the ultimate site of application. These hoses are sometimes difficult and dangerous to handle and replace, and the external heating can in some cases be insufficient to keep the thermoplastic material completely flowable. In the latter case the hose can become plugged with material which generally necessitates a complete replacement of the hose.

Finally, prior pumping units have provided no means for balancing the travel thereof during pumping operations. That is, most units of this type designed for pumping of bulk hot melt adhesives include a follower plate adapted to enter an adhesive barrel vertically. A common problem is that the material, as it is being heated and rendered flowable, passes around the periphery of the follower plate by virtue of the pressure exerted on the material by the weight and action of the follower. This not only causes material losses but can severely foul the pumping equipment.

Background patents and patents specifically describing pumping units for thermoplastic material include: U.S. Pat. Nos. 3,282,469, 2,522,652, 2,630,248, 3,031,106, 196,627, 700,988, 3,113,705, 3,619,566, 2,697,190, 3,723,020, 3,764,043, 3,727,029, 1,507,516, 1,663,077, 1,977,831, 2,518,748, and 2,735,586.

It is therefore the most important object of the present invention to provide a high-capacity auger-type pumping apparatus for handling thermoplastic materials such as hot melt adhesives and which is capable of safely and efficiently pumping and handling such materials having flow and melting points far above those heretofore capable of being handled by conventional pumping units.

Another object of the present invention is to provide a hot melt adhesive pumping assembly having an elongated material-conveying barrel provided with an axially rotatable auger screw positioned therewithin, along with means for shifting the pumping assembly into contact with the material to be pumped so that the material is progressively removed from a supply thereof; in preferred forms apparatus is provided for "stage heating" of the material along the length of the material-conveying barrel so that the handling characteristics of the material can be optimized.

A still further object of the invention is to provide apparatus of the type described which includes means for ensuring against the buildup of excessive pressures within the pumping apparatus during momentary slowdowns or stoppages in material flow, such that application operations with the apparatus can proceed on a semicontinuous or intermittent basis without fear that potentially destructive and hazardous internal pressures will be developed in the pumping unit.

As a corollary to the foregoing, another object of the invention is to provide a pumping assembly having an elongated, tapered, material-conveying barrel with a complementally tapered, axially rotatable auger situated therewithin, in conjunction with pressure responsive means for axially shifting the auger relative to the barrel in order to regulate pumping efficiency and preclude the buildup of untoward pressures in the apparatus. In preferred forms, the auger-shifting means is essentially automatic and comprises an auger-supporting piston and cylinder assembly in conjunction with means for supplying air at constant pressure to the cylinder such that in the event of a pressure buildup within the apparatus beyond a predetermined level, the auger will shift in opposition to the constant pressure force to decrease pumping efficiency; similarly when internal pressures return to safe levels, the auger will automatically be shifted back to its normal pumping position by the constant pressure force.

Another aim of the invention is to provide counterbalancing means for the pumping assembly so that the weight and the pumping action of the auger will not cause the thermoplastic material to pass around the periphery of the pumping assembly and foul the apparatus; in preferred forms the pumping assembly is supported and shifted by pneumatic piston and cylinder assemblies, and counterbalancing means is advantageously provided with the latter for maintaining a constant opposing air pressure against travel of the supporting pistons and thereby the pumping assembly.

Yet another object of the invention is to provide pumping apparatus having a reciprocal, heated pressure plate adapted to contact an initially solid supply of hot melt adhesive or the like, with segmented, metallic sealing structure situated circumferentially about the marginal edge of the pressure plate for ensuring the maintenance of a proper piston-like seal during pumping operations.

Another object of the invention is to provide hot melt adhesive pumping apparatus having an internally heated material conduit connected to the auger barrel in order to directly heat the material flowing therethrough and prevent hardening thereof and clogging of the conduit; in alternate forms the conduit can be of the flexible, reinforced variety or segmented wherein at least certain of the conduit segments are interconnected by means of swivel joints in order to facilitate operator control and application of the pumped material at a work station.

Finally, another object of the invention is to provide a pumping apparatus for removing bulk materials from barrels or the like which includes selectively operable, mechanical barrel-piercing means in order to relieve the characteristic partial vacuum developed within the barrel during pumping operations and thereby facilitate removal of the pumping assembly from the empty barrel. In the drawings:

FIG. 1 is a fragmentary view in partial vertical section of pumping apparatus in accordance with the invention, shown with a barrel of hot melt adhesive material positioned within the unit prior to commencement of pumping operations;

FIG. 2 is a vertical sectional view of the apparatus shown in FIG. 1 and illustrates the operation of the pumping apparatus;

FIG. 3 is a sectional view with parts broken away for clarity illustrating the upper surface of the shiftable pressure plate forming a part of the present invention;

FIG. 4 is an enlarged sectional view depicting one of the plug-type heating elements used for heating the pressure plate;

FIG. 5 is an enlarged, fragmentary view with parts broken away for clarity illustrating the tongue-and-groove connection of a pair of sealing ring-defining segments positioned about the pressure plate;

FIG. 6 is a partial sectional view taken along irregular line 6—6 of FIG. 5 and further illustrates the tongue-and-groove connection of the ring-defining segments;

FIG. 7 is an enlarged view of the preferred material-conveying conduit having a central loop-type heating element therein;

FIG. 8 is an essentially schematic view of the auger-shifting mechanism of the present invention with the auger in its normal pumping position;

FIG. 9 is a view identical to FIG. 8 but showing the auger shifted downwardly in a decreased pumping efficiency position;

FIG. 10 is an essentially schematic view of the counterbalancing means for the pumping assembly of the invention;

FIG. 11 is a fragmentary view in partial vertical section depicting the base-mounted barrel-piercing structure of the pumping apparatus; and FIG. 12 is a fragmentary view in partial vertical section which illustrates the alternate, segmented pipe form of material-conveying conduit used in the invention hereof.

Broadly, pumping apparatus 20 includes a frame or support assembly 22, a vertically reciprocal pumping assembly 24, supporting and shifting means 26 for the pumping assembly, and an elongated, internally heated delivery conduit 28 for application of the hot melt adhesive. Apparatus 20 also includes drive means 30 for the pumping assembly, auger-shifting means 32 for axially shifting the pumping auger as necessary (FIG. 8), counterbalancing means 34 for controlling pressure plate shifting (FIG. 10), and barrel-piercing structure 36 (FIG. 11).

Although forming no part of the present invention, it is to be understood that apparatus 20 is especially adapted for pumping and handling hot thermoplastic materials having high flow and melting points, such as hot melt adhesives. Such materials are conventionally shipped and stored in standard material-holding barrels as a solid mass. Referring specifically to FIGS. 1 and 2, a barrel 38 carrying a supply of initially solid hot melt adhesive 41 is situated within apparatus 20. Barrel 38 is of conventional construction and includes a pair of vertically spaced, circumferential stiffening rings 40 and an upper lip 42 defining the top of the barrel.

Support assembly 22 includes a generally planar base section 44 for supporting barrel 38 and a pair of spaced, upstanding channel guides 46 connected to base 44 on opposite sides of barrel 38. Each channel guide 46 is rigidly connected to base section 44 by provision of three spaced bracing elements 48. Finally, a pair of spaced arcuate drum-holding stops 50 are connected to base section 44 for facilitating proper positioning of barrel 38.

Pumping assembly 24 includes a metallic follower or pressure plate 52 having a circumferentially extending, sealing ring-receiving groove 54 about the periphery thereof. A segmented metallic sealing ring 56 later to be described is situated within groove 54 and serves to provide a resilient, piston-like seal between plate 52 and the adjacent interior sidewalls of barrel 38 as best illustrated in FIG. 2. The underside of plate 52 is configured to present a conical work surface 58 along with a plurality of spaced, generally circularly arranged, depending projections. The work surface 58 and projections 60 cooperatively define a heating surface for heating the hot melt adhesive. Each projection 60 is of open-top tubular construction (see FIG. 4) and is adapted to receive a high capacity, plug-type electric heating element 62 for heating of the entire metallic plate 52 and projections 60. Plate 52 is also provided with a central, axially extending aperture 64.

An elongated, uniformly tapered material-conveying barrel is received within central aperture 64 of plate 52, with the larger diameter end of barrel 66 presenting a material inlet 68 for the barrel. This inlet is above the initial heating surface presented by the bottoms of the projections 60, as will be apparent. A complemental, uniformly tapered, axially rotatable material-conveying auger 70 is operatively situated within barrel 66 and includes an elongated central shaft 72 and a continuous helical auger blade 74. Auger 70 is operable for moving material entering inlet 68 upwardly along the length of barrel 66 in the usual fashion. The upper end of barrel 66 is of smaller diameter than the lower end thereof and includes a radially extending, apertured cap portion 76, along with a tubular, radially extending material outlet 78 below the cap portion In this connection it will be noted that shaft 72 extends through the central aperture in cap portion 76 and above barrel 66 for driving connection with motor and drive apparatus to be described hereinafter.

Barrel 66 is heated along the length thereof by a plurality of annular, vertically spaced, individually controllable electric heating elements 80. Conventional insulation 82 is provided atop plate 52 and in surrounding relationship to barrel 66 and the heating elements 80, and an insulative removable housing 84 surrounds and supports the insulation 82.

Supporting and shifting means 26 includes a pair of upright pneumatic piston and cylinder assemblies 86 which are connected to base section 44 adjacent the respective guides 46 and include an air cylinder 88 and a vertically reciprocable internal piston 90 (see FIG. 10). The usual piston rod 92 is connected to each piston 90 and extends upwardly out of the respective cylinders 88. A generally transversely extending support beam 94 is connected to and supported by the respective rods 92 adjacent the outermost ends thereof. Pumping assembly 24 is connected to the underside beam 94 by means of two-stage tubular coupling structure 96. Referring specifically to FIG. 2, it will be seen that the upper end of structure 96 is secured to the underside of beam 94, while the lower end of structure 96 is connected to the uppermost cap portions 76 of barrel 52. Thus, selective movement of beam 94 through the use of the respective piston and cylinder assemblies 86 likewise serves to vertically move pumping assembly 24. In addition, a pair of bushing assemblies 98 are housed within coupling structure 96 and receive the section of auger shaft 72 extending through cap portion 76 and into the coupling structure. Beam 94 is also apertured adjacent the opposite ends thereof for receiving the supports 46. For this purpose beam 94 includes appropriate rollers 100 adjacent each beam-receiving aperture for providing a rolling contact between the beam and the guides 46. Thus, it will be seen that beam 94 and pumping assembly 24 are supported above barrel 38 by provision of the piston and cylinder assemblies 86; moreover, the latter allow assembly 24 to shift toward and into barrel 38 so that the adhesive 40 therein can be withdrawn, with the channels 46 guiding the vertical movement of the pumping assembly.

Drive means 30 is positioned atop beam 94 and is vertically shiftable with the latter. Drive means 30 includes an SCR-controlled, constant torque, variable speed drive motor 102, and a drive train generally referred to by the numeral 104 serving to axially rotate auger 70. Train 104 includes a first gear 106 directly coupled to the output shaft of motor 102, and an intermediate gear 108 in engagement with gear 106. Gear 108 is connected to an axially rotatable vertical shaft 110, and the latter has a gear 112 journaled to the lowermost end thereof. Finally, a gear 114 is secured adjacent the uppermost end of auger shaft 72 which extends above coupling structure 96. Drive train 104 is situated within appropriate gearbox or housing 116 and serves to transfer power from motor 102 to auger shaft 72 for selective axial rotation of auger 70. In this connection, it is to be noted that gear 112 is of substantially greater thickness than gear 114, such that the latter can shift vertically relative to gear 112 and still remain in meshed, drive-transmitting engagement therewith.

Referring to FIGS. 2 and 8, auger shifting means 32 will now be described. In particular, means 32 includes a pneumatically actuated piston and cylinder assembly 118 having an air cylinder 120 and a piston 122. Assembly 118 is located within housing 116 and has the depending piston rod 124 thereof connected to the uppermost end of auger shaft 70 by means of conventional thrust bearing structure 126.

Auger-shifting means 32 also includes a conventional pneumatic relay valve 128 which is in operative communication with the interior of cylinder 120, and a conventional air regulator 130 coupled to the latter. A pressurized air line 132 is connected to regulator 130 and has a bypass section 134 directly coupled to relay valve 128. A pilot line 136 interconnects regulator 130 and relay valve 128. The purpose of regulator 130 is to provide air under constant pressure (i.e., pilot air) to relay valve 128; the latter component in turn is operable to sense the pressure within cylinder 120 and maintain the air pressure therewithin at a pressure equal to that of the pilot air. This can be accomplished either by venting air from cylinder 120 through vent 138 or adding air to the cylinder through communicating line 140 as necessary. Thus the relay valve-regulator mechanism is operable to provide a relatively constant supporting force in opposition to downward shifting of auger 70 through the medium of piston and cylinder assembly 118.

Counterbalancing means 34 is operatively coupled to the respective piston and cylinder assemblies 86, and serves to provide a relatively constant supporting force opposing the downward vertical travel of pumping assembly 24 in order to regulate and coordinate pumping operations. As will be explained in detail hereinafter, this provides an important operational characteristic of the present invention. Means 34 includes an exhausting regulator valve 142 operatively coupled to the cylinders 88 and to a source of relatively high pressure air through line 144. In the most preferred form, a regulated air line 146 from valve 142, and a bypass air line 148 directly connected to line 146, are connected to a first three-way valve 150. The latter is connected by means of line 152 to a second three-way valve 154 having a venting port 156. Air lines 158 and 160 are respectively connected to the cylinders 88 on opposite sides of pistons 90 as will be apparent from a study of FIG. 10.

Barrel-piercing structure 36 is depicted in FIG. 11 and includes a reciprocal, pointed barrel-piercing element 162, a pivotally mounted foot pedal 164, and a slotted plate 166 coupling pedal 164 and element 162. As illustrated, structure 36 is mounted on base section 44 by means of an upright support 168, and the latter is configured to present a horizontally extending track 170 for guiding the reciprocation of element 162. The operation of structure 36 is depicted in phantom in FIG. 11, so as to provide a vacuum-relieving aperture in the bottom of barrel 38, when the latter is emptied of hot melt adhesive or the like.

Delivery conduit 28 is coupled to tubular outlet 78 of auger barrel 66 for delivery of material from barrel 38 to a work station. In detail, conduit 28 (see FIG. 7) preferably includes conventional coupling structure 172 for attachment to outlet 78, along with a threaded opening 174 adapted to receive a complementally threaded, apertured plug 176. Plug 176 supports the ends of a loop-type resistance heating element 178 which extends along the length of the conduit 28. These ends are connected to appropriate control means for controlled passage of current through element 178 in order to generate heat therein. In preferred forms, the conduit itself is in the form of a flexible, reenforced hose 180 which is threadably coupled to the structure 172. In alternate versions however, (see FIG. 12) a conduit 28a is provided in the form of a plurality of pipe sections 182. At least certain of the joints between the respective sections 182 are formed by using swivel couplings 184, in order to facilitate movement of the pipe conduit and application of material at the work station. However, the resistance heating element 178 is also provided with conduit 28a, in order to maintain the hot melt adhesive or the like flowing therethrough in the proper condition for application.

In the case of both embodiments 28 and 28a, a conventional applicator 186 is provided adjacent the outermost end of the hose 180 or multiple pipe conduit. Applicator 186 may be of any conventional construction, but generally includes a specialized tip 188 and a control button 190, so that the operator can selectively apply adhesive from the tip or interrupt flow thereof as desired.

Sealing ring 56 described above is depicted in detail in FIGS. 5 and 6 and is defined by a plurality of arcuate, slidably interfitted and connected segments 192. The latter are interconnected by means of tongue-and-groove joints 194. For this purpose, the opposite ends of the sections 192 are provided with a bifurcated, apertured groove-defining section 196, and a similarly apertured tongue section 198 which is dimensioned to slidably fit within the groove-defining section of an adjacent segment. Connecting pins 200 serve to couple the adjacent ends of the sections in order to present an annular ring.

A plurality of circumferentially spaced biasing springs 202 are seated within complemental recesses 204 provided about the periphery of groove 54 in plate 52, with each of the springs being in biasing engagement with an adjacent ring-defining segment 192 midway between the ends thereof. The springs 202 serve to bias sealing ring 56 radially outwardly relative to plate 52 in order to ensure that ring 56 remains in continuing sealing contact with the inner wall of barrel 38 (see FIG. 2) during pumping operations. In this regard it will be appreciated that by virtue of the slidable connection between the segments 192, ring 56 can radially expand and contract as necessary for ensuring an adequate seal. Furthermore, each segment 192 is preferably of sufficient width to bridge the stiffening rings 40 of barrel 38, so that a seal is maintained when such rings are encountered.

The operation of apparatus 20 is controlled by means of conventional SCR circuitry housed within console 206. This circuitry controls constant torque motor 102, plug-type heating elements 62, annular barrel heating elements 80, and the central conduit heating element 178. As will be discussed hereinafter, the conventional SCR circuitry preferably is provided for allowing individual or "stage" heating of the material during pumping operations in order to maintain the proper flow characteristics thereof. However, the specifics of this type of control circuitry are well known and need not be described herein as they form no part of the present invention.

In the operation of apparatus 20 when pumping assembly 24 is in its uppermost position depicted in FIG. 1, a barrel 38 containing hot melt adhesive material 41 is positioned on base section 44. This is accomplished simply by moving barrel 38 onto the base section until the bottom edges of the barrel engage the stops 50. The next step involves operating the three-way valves 150 and 154 so that relatively high pressure air from line 148 is delivered through line 158 to the top of the respective cylinders 88. This has the effect of lowering pumping assembly 24 into engagement with the upper surface of the solidified hot melt adhesive 41 within barrel 38. During this lowering sequence air escapes from the cylinders 88 through line 160 and out port 156.

The plug-type heating elements 62 within the tubular projection 60 of pressure plate 52 are next heated through the appropriate control circuitry within console 206, in order to begin softening the adhesive material 41. In this connection, the high capacity heating elements 62 which project from the underside of the conical work surface 58 are effective for adequately softening the adhesive 40 within a relatively short time.

After the uppermost portion of adhesive 41 is adequately softened to permit pumping operation to commence, motor 102 is actuated in order to begin withdrawal of the adhesive through inlet 68 of barrel 66. In addition, at this time counterbalancing means 34 comes into play. Valve 150 is turned so that low pressure regulated air from line 146 is directed to valve 154; also, the latter valve is manipulated so that this regulated air flows through line 160 in opposition to the downward travel of the pistons 90 (FIG. 10). The importance of counterbalancing means 34 lies in the provision of a relatively constant counterbalancing force in opposition to the shifting of pumping assembly 24 toward and into barrel 38. That is, the weight of pumping assembly 24 and the motor and drive structure carried by beam 94 is considerable, and this factor can cause an oozing of the softened hot melt adhesive around the edges of plate 52 onto the top thereof. This not only results in material loss, but can severely foul the pumping apparatus itself. Another factor in this connection is that auger 70 by virtue of the rotation thereof has the effect of pulling pumping assembly 24 into barrel 38, and this compounds the oozing problem. However, counterbalancing in accordance with the invention serves to overcome these potential problems by providing a constant opposing force to gravitation and pulling of the pumping assembly into barrel 38. In preferred forms, exhausting regulator valve 142 is designed to provide a regulated constant pressure supply of air through line 146 such that the opposing force developed by the counterbalancing means 34 essentially equals the downwardly directed force derived from the weight of the apparatus and the pulling force of the auger. Thus, the total downward force on plate 52 is preferably equal to about one atmosphere, and this has been found to give an advantageous pumping rate in practice. Of course the counterbalancing provided can be altered at will by appropriate adjustment of valve 142 to meet specialized conditions.

During the upward travel of material 41 through barrel 66, the spaced heating elements 80 are selectively operated in order to ensure that the material does not solidify and clog the barrel. In this regard, the elements are preferably individually controlled by conventional SCR circuitry so that the hot melt material can be "stage heated" to different temperatures during handling thereof. This material passes out tubular outlet 78 and through conduit 28 or 28a until it reaches applicator 186. At this point, application of the hot melt material can be effected by depressing control button 190 and applying the adhesive to selected work areas.

Also, as pumping assembly 24 gravitates and is pulled into barrel 38, outwardly biased sealing ring 56 maintains a close piston-like seal with the interior wall of the barrel. This also serves to preclude material loss around the periphery of the pressure plate 52 and moreover tends to create a partial vacuum within barrel 38 as material is progressively removed therefrom. This latter factor also serves to minimize material loss and fouling.

As the material 41 is progressively softened and pumped in the manner described, the material is continually passed during depression of button 190 for application through applicator 186. However, in the instances where button 190 is not depressed (as in a momentary slowdown or stoppage), a problem may arise by virtue of the buildup of back pressure throughout apparatus 20, and particularly within barrel 66.

In order to overcome this problem without stopping auger 70 and effectively shutting down apparatus 20, auger-shifting means 32 comes into play. As described, the auger-shifting means in effect serves to shift auger 70 axially within barrel 66 in response to a rise pressure within the latter to a level that exceeds a predetermined dangerous level. Downward shifting of the auger as viewed in FIG. 2 has the effect of increasing the distance between the outer edges of the auger blade 74 and the inner defining wall surfaces of barrel 66, so that pumping efficiency of the auger is decreased. In addition, the auger-shifting means 32 has the capability for returning auger 70 back to its normal pumping position after pressures within apparatus 20 fall below the predetermined danger level. However, it is noted that auger rotation is not interrupted during the shifting operations since the gears 112 and 114 remain in driving engagement at all times.

The relatively constant supporting force on auger 70 can be varied by varying the pilot air pressure delivered from regulator 130 to relay valve 128, and the latter component serves to maintain the pressure within cylinder 120 at a level equal to that of the pilot air.

It will also be appreciated that the auger shifting operations described above are essentially automatic and respond to the pressure within barrel 66. Thus, transitory high pressure situations can be handled with apparatus 20 without the necessity of stopping or in any way altering the operation of the overall unit. This is of course important in that the heating elements associated with apparatus 20 remain operable and the auger continues to rotate; thus, when it is decided to resume application of the adhesive, it is only necessary to again depress control button 190, whereupon normal operations recommence.

Provision of constant torque motor 102 also serves to further ensure against the buildup of excess pressures within apparatus 20. Specifically, during the described transitory high back pressure conditions, the rotational speed of auger 82 is reduced since the motor is programmed through the conventional SCR control circuitry to deliver only a constant torque. This also has the effect of reducing the pressure within apparatus 20 and facilitating the downward shifting of the auger as described, since the tendency of the auger to screw itself out of barrel 66 is reduced.

When pumping operations are completed and barrel 38 is essentially empty, barrel-piercing structure 36 can be used to vent the bottom of barrel 38 and relieve the partial vacuum developed therewithin. This merely involves (see FIG. 11) depressing pedal 164 which has the effect of shifting element 162 to the right for piercing the barrel.

The final step involves turning valve 150 to provide relatively high pressure air for valve 154 and line 160; this has the effect of raising the cylinders 190 and thereby lifting pumping assembly 24 out of barrel 38 until the pumping assembly is positioned in its initial orientation illustrated in FIG. 1. The empty barrel can then be removed from apparatus 20 and a new barrel full of material positioned in its place, whereupon the above described pumping operations are repeated.

It will thus be seen that the present invention provides a pumping apparatus for thermoplastic materials such as high melt adhesives which is capable of safely and efficiently handling such materials and permitting the easy application thereof. In practice, it has been found that apparatus in accordance with the invention can pump a high viscosity hot melt adhesive having a melting point of 650° F. or higher while at the same time facilitating the quick, safe application thereof.

Having thus described the invention, what is claimed as new and desired to be secured by Letters Patent is:

1. Material conveying apparatus, including
    an elongated barrel of tapered configuration having a material inlet and a material outlet;
    an elongated, complementally tapered, axially rotatable, axially shiftable auger situated within said barrel for conveying material along the length thereof from said inlet to said outlet;
    drive means coupled to said auger for selectively axially rotating the latter in a direction for conveying said material along the length of said barrel to said outlet; and
    means operatively coupled to said auger for axial shifting of the same relative to said barrel in a direction for increasing the distance between the outer edges of the auger and the adjacent interior wall surface of said barrel, and in response to a rise of pressure within the barrel to a level exceeding a predetermined pressure level.

2. Apparatus as set forth in claim 1 wherein said auger-shifting means includes apparatus for maintaining a relatively constant supporting force on said auger regardless of the pressure level within said barrel.

3. Material-conveying apparatus, comprising:
    an elongated barrel of tapered configuration having a material inlet and a material outlet;
    an elongated, complementally tapered, axially rotatable, axially shiftable auger situated within said barrel for conveying material along the length thereof from said inlet to said outlet;
    a constant torque, variable speed motor coupled to said auger for selectively axially rotating the latter in a direction for conveying said material along the length of said barrel to said outlet; and
    means operatively coupled to said auger for axial shifting of the same during rotation of said auger and relative to said barrel in a direction for increasing the distance between the outer edges of said auger and the adjacent interior wall surface of said barrel.

4. Material conveying apparatus, including:
an elongated barrel of tapered configuration having a material inlet and a material outlet;
an elongated, complementally tapered, axially rotatable, axially shiftable auger situated within said barrel for conveying material along the length thereof from said inlet to said outlet;
drive means coupled to said auger for selectively axially rotating the latter in a direction for conveying said material along the length of said barrel to said outlet; and means operatively coupled to said auger for axial shifting of the same during rotation of said auger and relative to said barrel in a direction for increasing the distance between the outer edges of the auger and the adjacent interior wall surface of said barrel.

* * * * *